United States Patent [19]

Kindersley

[11] 4,258,900
[45] Mar. 31, 1981

[54] STRUCTURE MAINTAINING SEATS AGAINST BALL VALVES

[75] Inventor: Peter G. Kindersley, Glens Falls, N.Y.

[73] Assignee: Kamyr Valves, Inc., Glens Falls, N.Y.

[21] Appl. No.: 41,083

[22] Filed: May 21, 1979

[51] Int. Cl.³ .............................................. F16K 5/06
[52] U.S. Cl. .................................. 251/172; 251/315; 251/363
[58] Field of Search ............... 251/304, 315, 363, 368, 251/172, 174

[56] References Cited

U.S. PATENT DOCUMENTS

| | | | |
|---|---|---|---|
| 2,839,074 | 6/1958 | Kaiser | 251/315 |
| 2,916,254 | 12/1959 | Wendell | 251/315 |
| 2,919,886 | 1/1960 | Hurst | 251/315 |
| 3,359,999 | 12/1967 | Mueller | 251/315 |
| 3,472,270 | 10/1969 | Masheder | 251/315 |
| 3,598,363 | 8/1971 | Shaw | 251/315 |
| 3,760,833 | 9/1973 | Kemp et al. | 251/315 |
| 3,949,965 | 4/1976 | Sharples et al. | 251/315 |
| 4,114,639 | 9/1978 | Cross et al. | 251/315 |

FOREIGN PATENT DOCUMENTS

| | | | |
|---|---|---|---|
| 2107921 | 8/1972 | Fed. Rep. of Germany | 251/315 |
| 1229515 | 4/1971 | United Kingdom | 251/315 |
| 1246076 | 9/1971 | United Kingdom | 251/315 |

Primary Examiner—William R. Cline
Assistant Examiner—H. Jay Spiegel
Attorney, Agent, or Firm—Cushman, Darby & Cushman

[57] ABSTRACT

A ball valve assembly that is solids-proof, corrosion-resistant, will maintain seals even under large pressure differentials, and can operate from cryogenic levels to high temperature ranges. An annular recess is formed in the valve body adjacent the ball, and an annular valve seat of rigid material is disposed in the recess. Facing surfaces of the valve body defining the recess and the valve seat are shaped to define a region therebetween having a larger volume (and cross-sectional area) at the high pressure side thereof than at the low pressure side thereof with the transition therebetween. A solid elastic material annular body, such as a sponge graphite body, is disposed in the recess to positively elastically engage the surfaces along the transition upon application of high pressure to the high pressure side of the region, to bias the valve seat into tight sealing engagement with the ball. The surfaces may be beveled, with an angle of convergence of about 2° to 20°, may provide one or more right angle step portions, and/or may be provided as two, spaced, regions with an annular stop member disposed between the elastomeric body in each of the two, spaced, regions.

15 Claims, 9 Drawing Figures

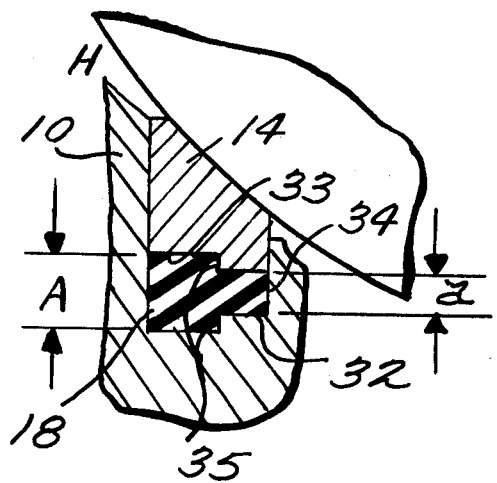
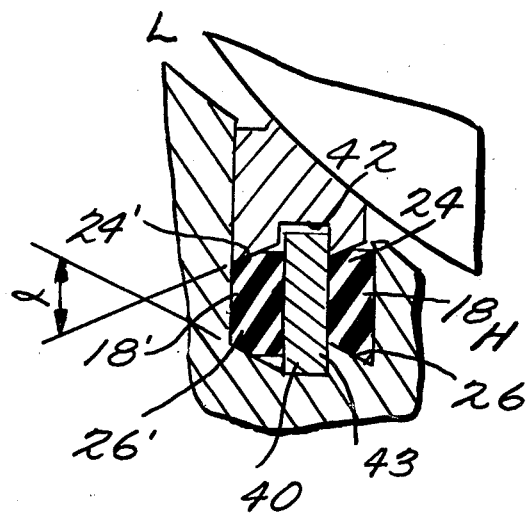
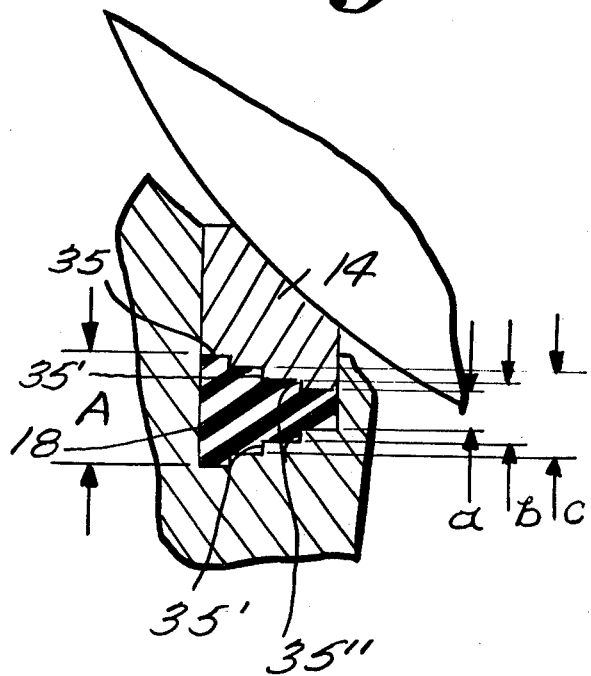
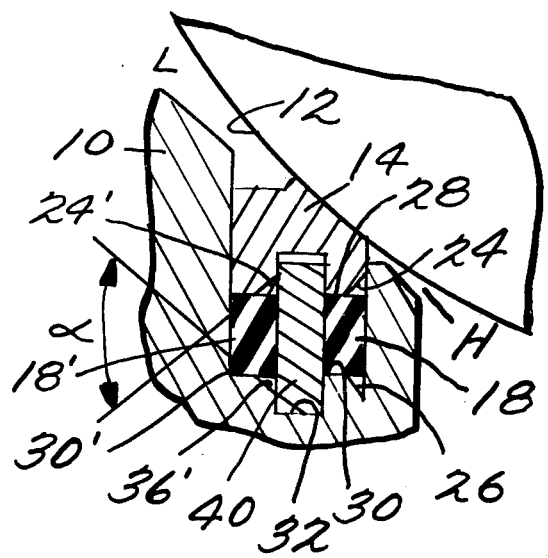

STRUCTURE MAINTAINING SEATS AGAINST BALL VALVES

BACKGROUND AND SUMMARY OF THE INVENTION

Ball valves provide versatile valving assemblies, and are especially suited for valving fluids with fine solids intermixed therein, due to the simple opening and closing action of such valves. It is necessary to provide seats for ball valves, however, that are held tightly against the ball at all times to prevent solids entry between the seat and valve. Desirably sealing systems are provided for such valves which are resistant to corrosion even when subjected to the wide variety of chemical streams found in conventional industrial applications, they must be able to hold large pressure differences across them (such as will be imposed when the valve is in closed position), and they desirably operate over a wide range of temperatures (e.g., from cryogenic levels to about 2000° F.).

According to the present invention, an assembly is provided which properly effects a seal between high pressure and low pressure areas. The assembly according to the present invention may be utilized as a ball valve which is completely solids-proof, is corrosion-resistant to a wide variety of chemical streams, can maintain large pressure differentials (e.g., 6000 psi), and can operate from cryogenic levels to high temperature regions.

The ball valve assembly according to the invention includes a valve body having a fluid conducting passageway therethrough with high and low pressure sides of the passageway, a ball valve mounted for rotation within the valve body, means defining an annular recess in the valve body adjacent the ball and in operative communication with the passageway, an annular valve seat of hard mineral, metal, or ceramic disposed in the recess, and a solid elastic material annular body disposed in the recess to bias the valve seat into tight sealing engagement with the ball. Surface means, provided on facing surfaces of the valve body defining the recess in the valve seat, are provided for defining a region between the valve body and the valve seat having a larger volume (and cross-sectional area) at the high pressure side thereof than at the low pressure side thereof with a transition therebetween. The solid elastic material body is disposed in this region and provides means for positively elastically engaging the surface means along the transition upon the application of high pressure to the high pressure side of the region. The body changes shape only microscopically. The larger volume portion of the region abruptly opens into another region having a much larger volume, and is in direct communication with the passageway.

The surface means defining the region can take a wide variety of forms. In general the surfaces are shaped so that a line of high pressure contact pressure is obtained that exceeds the fluid pressure, blocking out any fluid passage, even with pressure differentials of about 6000 psi.

One specific form the surface means can take is one or more right angle step portions formed in each of the valve body defining the recess and the valve seat. Another form comprises beveled surfaces formed in each of the valve body defining the recess and the valve seat, the beveled portions preferably having an angle of convergence of about 2° to 20° and including flattened parallel extensions thereof where desired. The surface means may further define two, spaced, regions with a pair of annular solid elastomeric bodies provided, one disposed in each of the regions, with an annular stop member disposed between the pair of annular solid elastomeric bodies to provide an over-travel stop that prevents excessive seat or ball motion that could overcompress the elastomeric bodies.

The solid elastic material body may be rubber, synthetic elastomers, or the like, and preferably is selected from the group consisting essentially of sponge graphite, sponge ceramic and corrosion-resistant elastomers. The solid elastic material body is preferably rectangular in cross-section, providing a very tight seal arrangement when deformed into engagement with the surface means provided on facing surfaces of the valve body defining the recess and the valve seat.

It is the primary object of the present invention to provide an improved sealing system especially adapted for a ball valve assembly. This and other objects of the invention will become clear from an inspection of the detailed description of the invention, and from the appended claims.

BRIEF DESCRIPTION OF THE DRAWINGS

FIGS. 3 through 6 are detailed cross-sectional views of further valve seat-biasing embodiments according to the present invention with the solid elastomeric bodies in compressed condition;

DETAILED DESCRIPTION OF THE DRAWINGS

Figure 1:
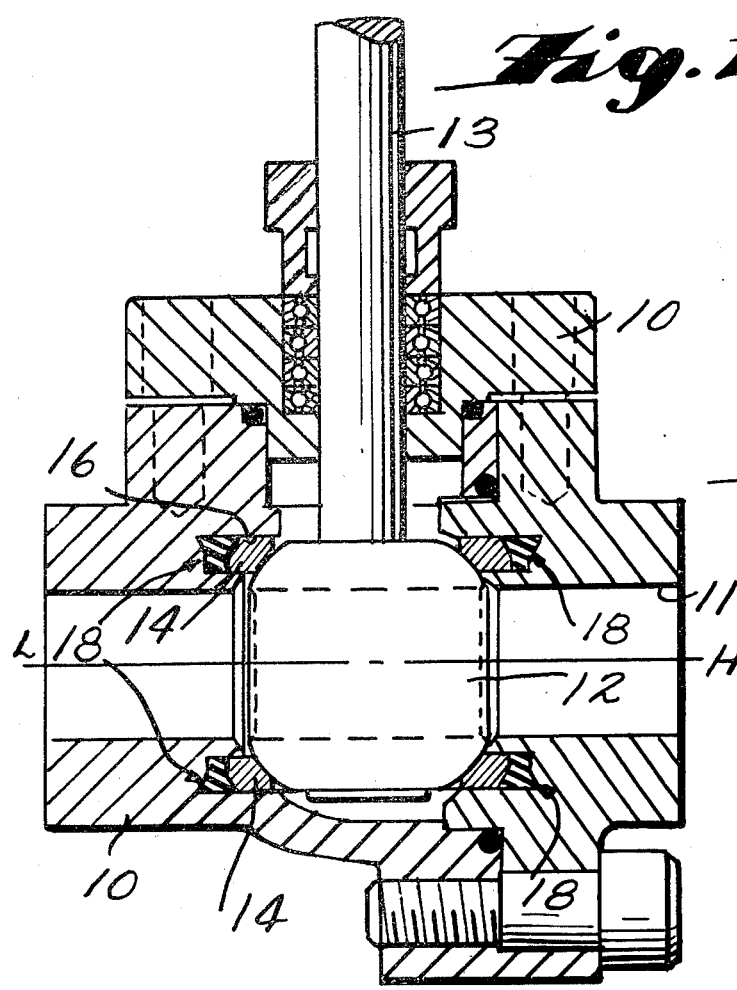
FIG. 1 is a side view partly in cross-section and partly in elevation illustrating an exemplary ball valve assembly according to the present invention.

An exemplary ball valve assembly according to the present invention is illustrated in FIG. 1. The assembly includes the conventional components of a valve body 10 having a fluid conducting passageway therethrough, the passageway having a high pressure side H and a low pressure side L when closed. A ball valve 12 is mounted for rotation within the body 10 to selectively allow or prevent the passage of fluid through the passageway 11. A stem 13 is provided for rotating the ball 12. An annular valve seat 14 of rigid material is also provided for sealingly engaging the ball 12. Preferably, the valve seat 14 is made of metal, ceramic, or hard mineral. Means are provided defining a recess 16 in the valve body 10 adjacent the ball 12 and in operative communication with the passageway 11, and the annular valve seat 14 is disposed in the recess 16. A low pressure volume is defined by the valve components between the ball 12 and body 10 on the opposite side of the recess 16 from the passageway. A solid elastic material annular body 18 is disposed in the recess to bias the valve seat 14 into tight sealing engagement with the ball 12, fluid being incapable of passing through passageway 11 except through the bore formed in the ball 12.

According to the present invention, surface means are provided, on facing surfaces of the valve body 10 defining the recess 16 and the valve seat 14, for defining a region between the valve body 10 and the valve seat 14 having a larger volume (and cross-sectional area) at the high pressure side thereof than at the low pressure side thereof with a transition therebetween. The solid elastic material body 18 is disposed in this region and provides means for positively elastically engaging the surface means along the transition upon application of high pressure to the high pressure side of the region. Such surface means may take a wide variety of forms, different embodiments thereof being illustrated in FIGS. 2 through 6. In general the surfaces are shaped so that a line of high pressure is obtained that exceeds the fluid pressure, blocking out any fluid passage, even with pressure differentials of about 6000 psi.

Figure 7:
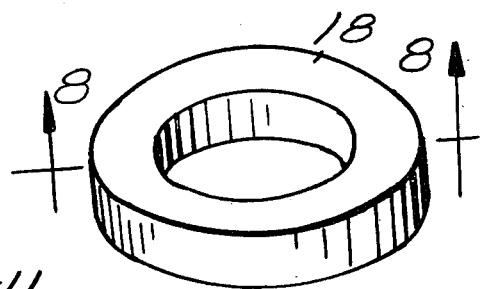
FIG. 7 is a perspective view of an exemplary solid elastic material body utilized in practicing the present invention.
Figure 8:
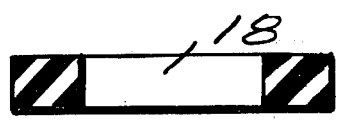
FIG. 8 is a cross-sectional view of the body of FIG. 7 taken along lines 8—8.
Figure 2A:
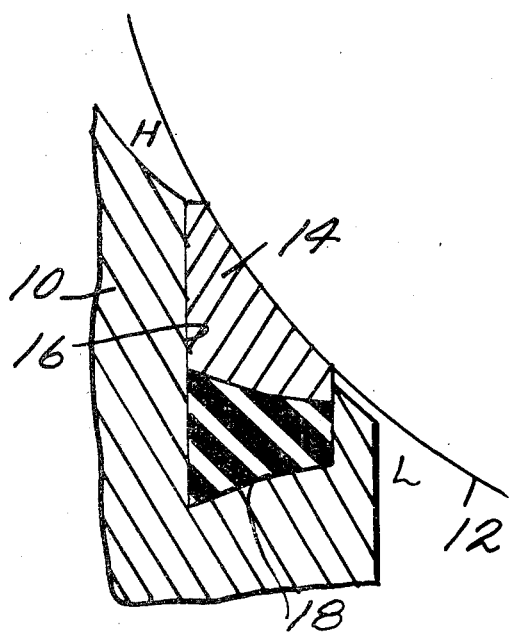
FIGS. 2a and 2b show one embodiment of an exemplary valve seat-biasing arrangement according to the present invention, with the solid elastomeric material biasing bodies in compressed condition.
Figure 2B:
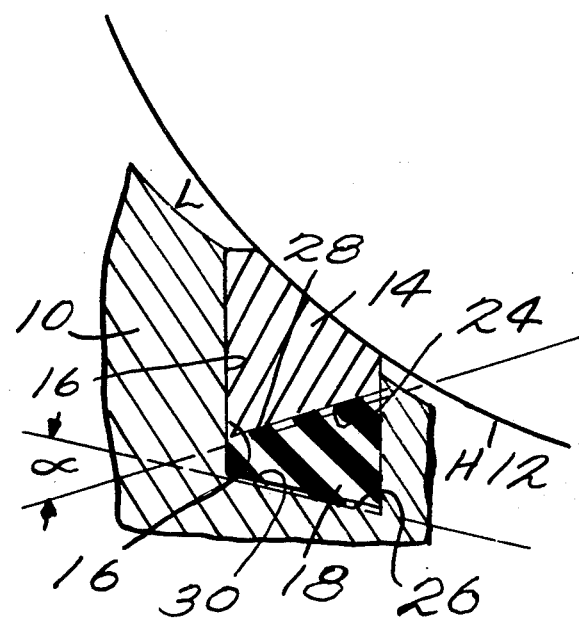

In FIGS. 2a and 2b the surface means takes the form of corresponding beveled surfaces 24, 26 disposed, respectively, on the valve seat 14 and the valve body 10 defining the recess 16. The FIG. 2b embodiment is for the opposite high pressure condition as the FIG. 2a embodiment. The beveled surfaces 24, 26 are arranged so that an angle of convergence α thereof is disposed on the low pressure side L, rather than on the high pressure side H. While in the drawings such an angle of convergence α has been exaggerated for clarity, most preferably it will be between about 2° and about 20°, each surface 24, 26 making an angle of about 1° to 10° with a line bisecting the angle α. As illustrated most clearly in FIGS. 6-8, the body 18 preferably has a rectangular cross-section and when high pressure is applied to the larger volume portion of the region, the body 18 is pushed into positive sealing engagement with the transition provided by the surfaces 24, 26. As illustrated in FIGS. 2a, 2b and 6, the surface means may further comprise flattened parallel extensions 28, 30 of the beveled surfaces 24, 26, the body 18 also engaging the flattened extensions 28, 30.

In the embodiment illustrated in FIG. 3, the surface means comprises the corresponding surfaces 31, 32 of the valve seat 14 and 33, 34 of the valve body 10 defining the recess 16, therebetween providing a right angle step portion 35. When high pressure is provided at the high pressure side H, the body 18 is urged more tightly into sealing engagement against right angle step portion 35. Body 18 will change shape only microscopically.

In the embodiment illustrated in FIG. 5, a series of right angle step portions 35, 35', 35" are provided, each of such step portions acting with the seal as happens singly with the single step of FIG. 3.

In the FIG. 3 embodiment, the dimension "a" is about 0.8 to 0.95 A, while in the FIG. 4 embodiment, preferably the dimension "a" is about 0.85 A, b=about 0.9 A, and c=about 0.95 A. These dimensional differences are shown exaggerated in the drawings for illustrative purposes.

In the FIGS. 4 and 6 embodiment, the surface means define two, spaced, said regions, with a pair of said annular solid elastomer bodies 18, 18' being provided, one disposed in each of the regions. These embodiments further include an over-travel stop for preventing excessive compression of the bodies 18, 18'. This over-travel stop preferably takes the form of a metal (or other rigid material) ring 40 disposed between the bodies 18, 18', the stop member 40 operatively engaging surface portions 42, 43 of the valve seat 14 and valve body 10, respectively, to positively locate the stop member 40 with respect to the regions disposed on either side thereof. In the embodiment illustrated in FIG. 5, the beveled surfaces 24, 26 and 24', 26' terminate abruptly, while in the FIG. 6 embodiment, the surfaces terminate in flattened parallel extensions 28, 30, 28', 20' (much as in the FIGS. 2a and 2b embodiment).

Utilization

In utilizing the ball valve assembly according to the invention, the rectangular cross-section solid elastomeric material bodies 18 (and 18') are disposed in the respective recesses 16, the rigid material annular valve seats 14 are also disposed in the recesses 16 engaging the bodies 18, and provide precompression for the bodies 18 (as indicated in FIGS. 3, 4, and 5). With the ball valve 12 disposed in place adjacent the valve seats 14, and with the ball valve 12 in position blocking the flow of fluid in passageway 11, high pressure in the side passageway 11 will cause the seal 18 (and 18') to be urged into even tighter engagement with the surface means on the facing surfaces of the valve body and the valve seat (e.g., 24, 26; or 35). The bodies 18 prevent entry of solids between the ball 12 and body 10, maintain sealing even under large pressure differentials, and can be readily constructed to be corrosion-resistant and to operate from cryogenic levels to high temperature regions (e.g., 2000° F.). Excessive compression of the body 18 (18') can be prevented by an over-travel stop member 40.

Thus, it will be seen that according to the present invention a versatile, improved ball valve assembly has been provided. While the invention has been herein shown and described in what is presently conceived to be the most practical and preferred embodiments thereof, it will be apparent to those of ordinary skill in the art that many modifications may be made thereof within the scope of the invention, which scope is to be accorded the broadest interpretation of the appended claims so as to encompass all equivalent structures and assemblies.

What is claimed is:

1. A ball valve assembly comprising a valve body having a fluid conducting passageway therethrough, the passageway comprising a high pressure side; a ball valve mounted for rotation within the valve body to selectively allow or prevent the passage of fluid through the passageway; means defining an annular recess in said valve body adjacent said ball and in operative communication with said passageway; means defining a volume between said ball and body on the opposite side of said recess from said passageway, said volume comprising a low pressure side; an annular valve seat of rigid material disposed in said recess; and a solid elastic material annular body disposed in said recess to bias said valve seat into tight sealing engagement with said ball; wherein the assembly is operative over a wide range of temperatures, is solids proof, and can maintain large pressure differentials, and further comprises:

surface means, provided on facing surfaces of said valve body defining said recess and said valve seat, for defining a region between said valve body and said valve seat having a larger cross-sectional area at the high pressure side thereof than at the low pressure side thereof with a transition therebetween said surface means converging toward each other along said transition; and wherein said solid elastic material body is disposed in said region and provides means for positively elastically engaging said surface means along said transition upon application of high pressure to said high pressure side of said region.

2. An assembly as recited in claim 1 wherein said surface means comprises a right angle step portion formed in each of said valve body defining said recess, and said valve seat.

3. An assembly as recited in claim 2 wherein said surface means comprises a series of said right angle step portions.

4. An assembly as recited in claim 1 wherein said surface means comprises corresponding beveled surfaces formed in each of said valve body defining said recess, and said valve seat.

5. An assembly as recited in claim 4 wherein said beveled portions have an angle of convergence of about 2°–20°.

6. An assembly as recited in claim 4 wherein said surface means further comprise flattened parallel extensions of said beveled surfaces defining part of said region in which said solid elastomeric body is disposed, engaging said flattened extensions.

7. An assembly as recited in claim 1 wherein said surface means define two, spaced, said regions, and wherein a pair of said annular solid elastomeric bodies are provided, one disposed in each of said regions.

8. An assembly as recited in claim 7 further comprising a discrete annular stop member disposed between said pair of annular solid elastomeric bodies.

9. An assembly as recited in claim 8 wherein said annular stop member operatively engages surface portions of both said valve seat and said valve body to positively locate said stop member with respect to said regions.

10. An assembly as recited in claim 1 wherein said elastomeric material body is selected from the group consisting essentially of sponge graphite, sponge ceramic, and corrosion-resistant elastomers.

11. An assembly as recited in claims 1, 2, 4, 7, or 10 wherein said solid elastomeric material body is rectangular in cross-section.

12. An assembly as recited in claim 1 wherein said larger cross-sectional area portion of said region is in direct communication with said passageway.

13. An assembly as recited in claim 1 wherein said surface means are shaped so that a line of high pressure contact pressure is obtained that exceeds the fluid pressure, blocking out any fluid passage between said solid elastic material body and said valve body and valve seat, even with a pressure differential between the low and high pressure sides of about 6000 psi.

14. An assembly as recited in claim 1 further comprising an over-travel stop for preventing excessive compression of said solid elastic material body.

15. An assembly for providing a seal between a high pressure area and a low pressure area, comprising
 a body disposed within said areas and having a passageway extending therethrough, and defining the high pressure area therein;
 a blocking member disposed in said passageway;
 means defining a recess in said body adjacent said blocking member and in operative communication with said passageway;
 means defining a volume between said blocking member and body on the opposite side of said recess from said passageway, said volume defining the low pressure area;
 a seat member of rigid material disposed in said recess;
 surface means, provided on facing surfaces of said body defining said recess and said seat member, for defining a region between said body and said seat member having a larger cross-sectional area at the side thereof closest to the high pressure area than at the side thereof closest to the low pressure area, with a transition therebetween, said surface means converging toward each other along said transition; and
 means for positively elastically engaging said surface means along said transition upon application of high pressure thereto from the high pressure area and biasing said seat member into contact woth said blocking member, said means comprising a solid elastic material body, of substantially rectangular cross-section, disposed in said recess.

* * * * *